Dec. 7, 1926.

R. REICH

RADIUS ROD

Filed Oct. 4, 1923  2 Sheets-Sheet 1

1,609,382

Witnesses
John Donovan

Inventor
Ralph Reich
By Richard B. Owen
Attorney

Dec. 7, 1926.
R. REICH
1,609,382
RADIUS ROD
Filed Oct. 4, 1923    2 Sheets-Sheet 2
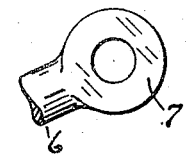
Fig. 7.
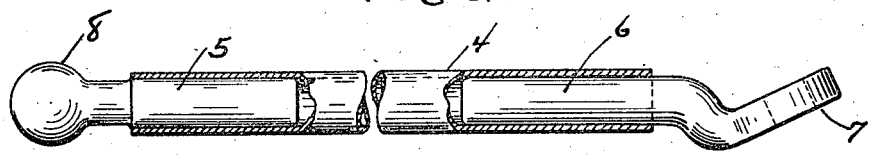
Fig. 6.
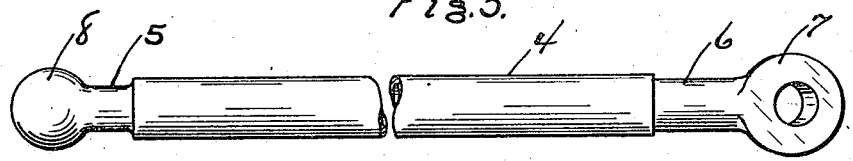
Fig. 5.
Fig. 4.
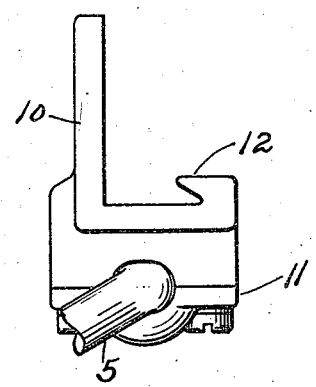
Inventor
Ralph Reich
By Richard B. Owen
Attorney
WITNESSES Patented Dec. 7, 1926.

1,609,382

UNITED STATES PATENT OFFICE.

RALPH REICH, OF RINGTOWN, PENNSYLVANIA.

RADIUS ROD.

Application filed October 4, 1923. Serial No. 666,568.

The present invention relates to radius rods and has for its principal object to provide a radius rod for use on Ford automobiles and the like whereby the axle and chassis may more efficiently be braced in relation to each other.

Another object of the invention is to provide a radius rod assemblage capable of replacing the assemblage now in use especially when the socket on the crank case becomes worn and useless.

With the above and other objects in view, which will appear as the description proceeds, the invention resides in certain novel features of construction, and in the combination and arrangement of parts as will be hereinafter more described and claimed.

In the drawing:

Figure 4 is an end elevation of the clamp;

Figure 5 is a bottom plan view of one of the radius rods;

Figure 6 is a side elevation thereof showing parts in section; and

Figure 7 is a detail view of one end of one of the rods.

Figure 1:
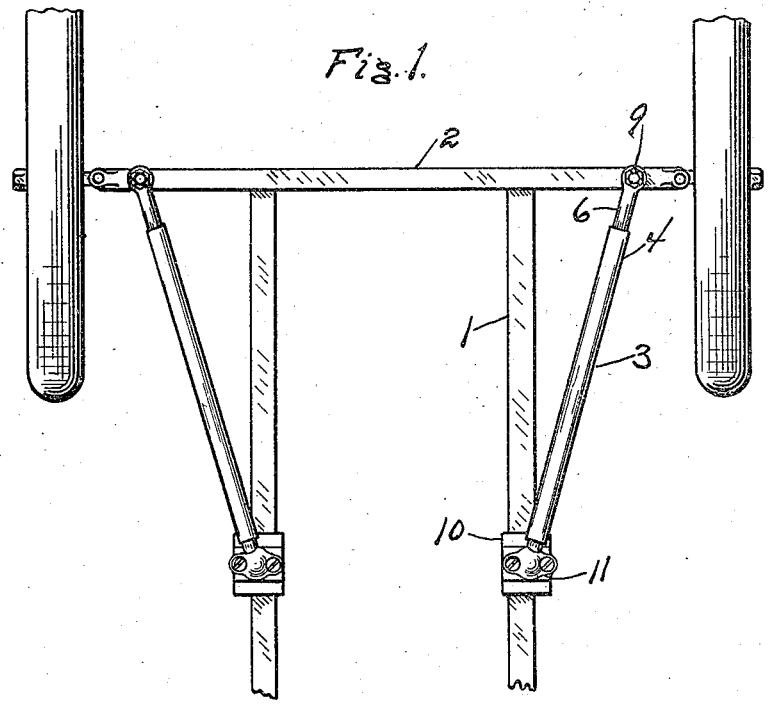
Figure 1 is a fragmentary bottom plan of a Ford chassis showing the radius rod thereon.
Figure 2:
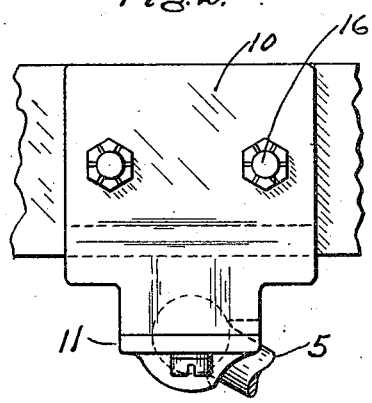
Figure 2 is a side elevation of one of the clamps used in connection with the radius rods.
Figure 3:
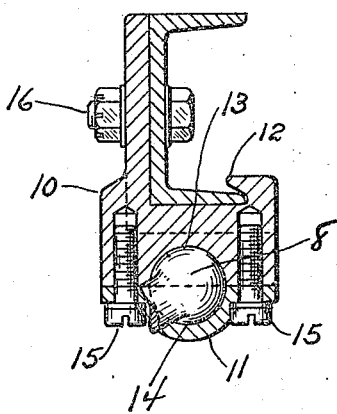
Figure 3 is a section through the clamp.

Referring to the drawing in detail it will be seen that 1 designates the chassis of a Ford automobile and 2 the forward axle thereof. I provide a pair of radius rods 3 each of which consist of a tubular member 4 and end members 5 and 6 which are insertable in the ends of the tubular member 4 whereby the lengths of the rods may be varied as desired. After the members 5 and 6 have been inserted in the tubular member 4 they may be welded in place or held in any suitable manner. The end member 6 is provided with an apertured lip 7 extending annularly from the rod as a whole. The end member 5 terminates in a ball 8. The apertured lip 7 is adapted to be received by the spring bolt 9 as is now the common practice. A pair of socket clamps are disposed on the chassis each consisting of an L-shaped body 10 and a clamp plate 11. The L-shaped body 10 is provided with an over-hanging extension 12 so as to fit over a portion of the chassis 1 as clearly illustrated in Figure 3. The same leg of the body 10 which is provided with the overhanging extension 12 is provided on its bottom with a socket recess. The plate 11 is provided with a socket recess 14 adapted to register with the socket recess 13 thereby forming a socket for the reception of the ball 8, the plate 11 being held in place by bolts 15.

The clamp is held in engagement with the chassis by a bolt 16 which passes through the upper leg of the body 10 and through the chassis.

This radius rod assemblage will be more efficient than that now commonly used on Fords since the connection between the chassis axle is direct rather than being through the crank case. It will also be seen that this assemblage may be substituted for that now in use. Although I have described my invention with a certain degree of particularity, it is evident that numerous changes in the details of construction and in the combination and arrangement of parts may be resorted to without departing from the spirit or scope of the invention as hereinafter claimed.

What is claimed is:

1. In combination with a radius rod having a ball terminal, and a channel-shaped side rail of a motor vehicle chassis having a vertical web and horizontal flanges, a clamp body including a vertical leg disposed against the web of said chassis rail and a horizontal leg extending laterally from the lower end of the vertical leg and disposed against the under side of the lower flange of said chassis rail, an upwardly and inwardly projecting extension on the free end of said horizontal leg embracing the free edge of the lower flange of said chassis rail, means rigidly securing said vertical leg to said chassis rail, and a clamp plate detachably secured to the under side of the horizontal leg of said clamp body, said horizontal leg and said clamp plate having registering recesses forming a spherical socket in which the ball terminal of the radius rod is retained by said clamp plate.

2. In combination with a radius rod having a ball terminal, and a channel-shaped side rail of a motor vehicle chassis having a vertical web and horizontal flanges, a clamp body including a plate-like vertical leg disposed against the web of said chassis rail and a horizontal leg extending laterally from the lower end of the vertical leg and disposed against the under side of the lower flange of said chassis rail, an upwardly and inwardly projecting extension on the free end of said horizontal leg embracing the free edge of the lower flange of said chassis rail, bolts passing through said vertical leg and the web of said chassis rail for rigidly securing the clamp body to said chassis rail, and a clamp plate detachably secured to the underside of the horizontal leg of said clamp body, said horizontal leg and said clamp plate having registering recesses forming a spherical socket in which the ball terminal of the radius rod is retained by said clamp plate.

3. In a device of the class described, a radius rod clamp including a body having a vertical leg adapted to be disposed against one side of the side rail of a motor vehicle chassis and a horizontal leg extending laterally from the lower end of the vertical leg and adapted to be disposed against the under side of said chassis rail, an upwardly and inwardly projecting extension on the free end of said horizontal leg adapted to embrace an edge of the side rail of the chassis, means to rigidly secure said vertical leg to said chassis rail, and a clamp plate detachably secured to the underside of the horizontal leg of said clamp body, said horizontal leg and said clamp plate having registering recesses forming a spherical socket for reception of a ball terminal of the radius rod.

4. In a device of the class described, a radius rod clamp including a body having a vertical leg adapted to be disposed against one side of the side rail of a motor vehicle chassis and a horizontal leg extending laterally from the lower end of the vertical leg and adapted to be disposed against the under side of said chassis rail, an upwardly and inwardly projecting extension on the free end of said horizontal leg adapted to embrace an edge of the side rail of the chassis, means to rigidly secure said vertical leg to said chassis rail, and a clamp plate detachably secured to the underside of the horizontal leg of said clamp body, said horizontal leg and said clamp plate having registering recesses forming a spherical socket for reception of a ball terminal of the radius rod, the horizontal leg of the clamp body being relatively thicker and provided with threaded sockets at opposite sides of the recess of said horizontal leg, the means for securing the clamp plate to the horizontal leg embodying stud screws passing through the clamp plate and threaded into the sockets of the horizontal leg.

In testimony whereof I affix my signature.

RALPH REICH.